Figure 1:
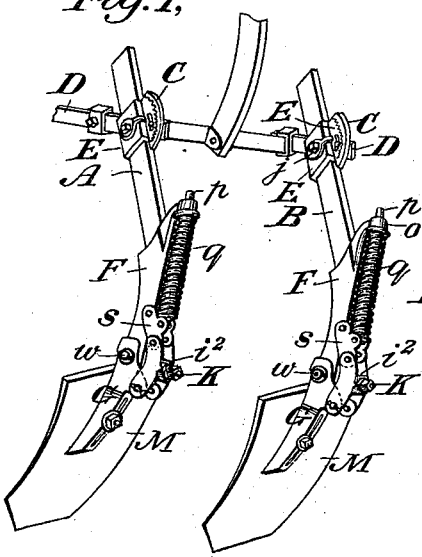

(No Model.)

W. H. HOLSCLAW.
CULTIVATOR.

No. 530,844. Patented Dec. 11, 1894.

Witnesses:—
D. N. Nayport
M. E. Fetter

Inventor:—
W. H. Holsclaw
By atty J. N. McIntire

UNITED STATES PATENT OFFICE.

WILFORD H. HOLSCLAW, OF LOUISVILLE, KENTUCKY, ASSIGNOR TO THE B. F. AVERY & SONS, OF SAME PLACE.

CULTIVATOR.

SPECIFICATION forming part of Letters Patent No. 530,844, dated December 11, 1894.

Application filed May 1, 1894. Serial No. 509,634. (No model.)

*To all whom it may concern:*

Be it known that I, WILFORD H. HOLSCLAW, of Louisville, in the county of Jefferson and State of Kentucky, have invented a certain new and useful Improvement in Cultivators; and I do hereby declare that the following is a full, clear, and exact description of the same, reference being had to the accompanying drawings, forming part of this specification.

My invention relates to cultivators, and has for its main object to improve the construction of that type of machines in which it is necessary, in order to successfully adapt the implement to the cultivation of different crops, at various stages of the latter, to have the cultivating blades, or cultivator devices, *per se*, capable of adjustment, relatively as to depth of penetration of the soil, and also as to the planes of the several blades to adapt the machine to operate successfully with blades of various forms, and at different stages, or conditions, of the plants to be cultivated.

As is well known to those familiar with cultivators and their uses, in cultivating, for instance, corn and kindred plants, when there are no ridges of the soil, almost any good form of machine will answer to perform properly the first cultivation; but in the subsequent treatment of the plants, and during the various stages of the cultivation, so to speak, it becomes necessary to use differently shaped blades, which renders necessary a variation in the position in which, or the angle at which, the blade standard stands, in order to give to certain forms of blades the proper "set," to enable them to freely take the ground.

I propose, by my improvements, to furnish for use a cultivator, which shall possess all these necessary requirements as to variations in and adjustments of its cultivating blades, and which, at the same time, shall be simple and durable in its construction; efficient in operation; and easy of management by the farmer.

To the ends and objects hereinabove stated, my invention consists in the novel structural features, or combinations of devices, which will be found hereinafter fully explained, and which will be particularly pointed out in the claims of this specification.

To enable those skilled in the art to which my improvements relate, to make and use cultivators embodying the same, either in part, or in whole; and in either the precise forms in which I show my invention carried out, or under some modification thereof, I will now proceed to more fully describe my improved cultivator, referring by letters and figures to the accompanying drawings, which form part of this specification, and in which I have shown my invention carried into effect under those precise details of construction which I have so far used in practicing it.

Figure 2:
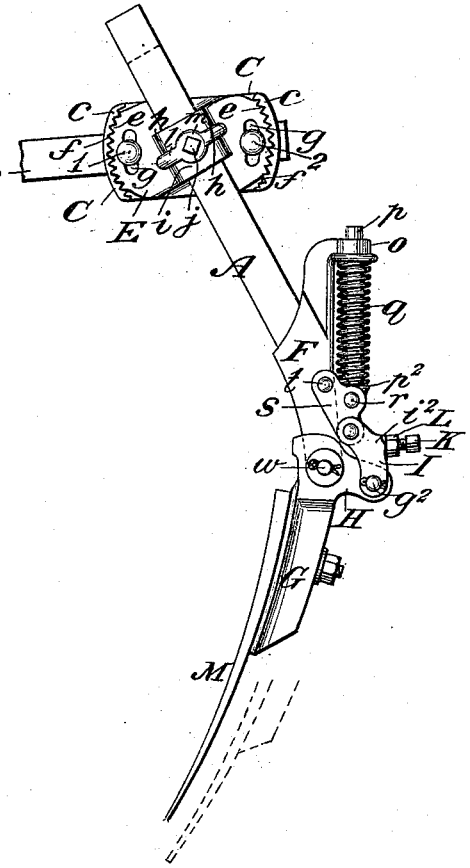
Figure 3:
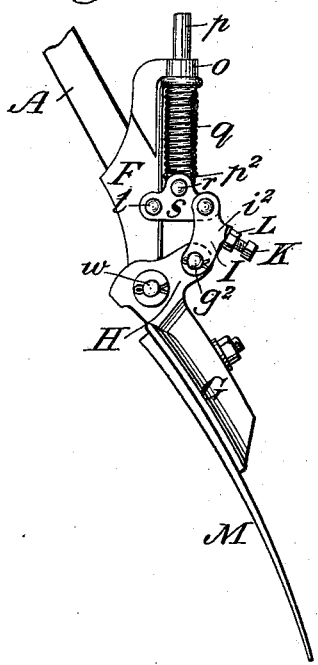
Figure 4:
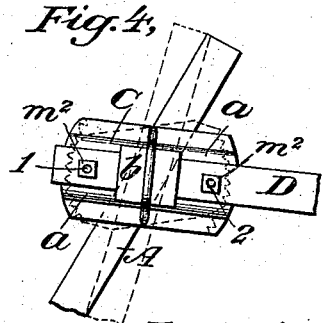

In the drawings, Figure 1 is a perspective view of so much of a cultivator (of approved form), as is necessary to be shown, in order to illustrate my invention. Fig. 2, is a side view of one of the cultivator standards detached, and drawn on an enlarged scale. Fig. 3, is a partial similar view, but showing a different position of the standard heel and tripping devices. Fig. 4, is another partial side view of the standard, showing the opposite side, and having the standard differently adjusted, or set; and in all the views, the same part will be found always designated by the same letter or figure of reference.

A and B are the two standards at one side of a gang, wheeled, cultivator of any approved general constructions, each of which standards is securely attached to the usual beam, by means of devices, the construction and operation of which I will now explain.

C is a cast iron shoe-piece, or device, having, on one side, longitudinal ribs $a$, bridged together by a loop-like portion $b$ of the casting; all as clearly shown; and between the adjacent faces of said ribs $a$, and inside of the bridging part $b$ is arranged, to fit loosely, the metallic bar, or beam, D, which serves to support the depending blade standard A; the said beam D being secured to said casting C, by means of two bolts 1 and 2, which bolts serve to also secure to casting C another metallic shoe-piece E. This part E is arranged with its inner surface in contact with the adjacent surface of casting C, and has its curved ends serrated, or toothed, at $e$, to engage, or mesh, with the teeth, or notches $f$, formed in the end flanges $c$ of casting C, all as plainly shown, while in the casting E are oblong curved apertures $g$, for the accommodation of the bodies of the bolts 1 and 2, in a manner and for a purpose to be presently explained.

The plate, or shoe-piece E, is provided (like casting C) with rib-like projections $h$, and a loop-like device $i$, between which ribs, and inside of which loop $i$ is arranged, with a sliding fit, the standard A, that is securely clamped fast in, or confined securely within said loop $i$, by means of a set-screw, or binder-bolt $j$, fitted therein, and bearing, at its end, against the standard A, all as clearly shown in the drawings. The yoke, or loop-like part $i$ of the casting E, is preferably formed with a strengthening rib $l$ and hub-like boss $m$, to attain the requisite rigidity and durability, with the least amount of metal; and the said yoke and the ribs $h$ are arranged to run crosswise of the casting E, obliquely, so that, as illustrated, the blade-standard A stands oblique to the line of the cultivator beam D.

On the lower curved end portion of the standard A is fitted a hollow casting or socketed device F, the lower half of which about conforms in shape (in side view) with the curved portion of standard A; but the upper half of which branches off, rearwardly and upwardly, from said standard, and has its hub-like projection $o$ perforated to accommodate the upper end of a push-bar $p$, around which is coiled a powerful spiral spring $q$ (that acts expansively) and the lower end of which is formed with a cross head $p^2$ that is journaled on a pin $r$ that is mounted, as shown, in a pair of plate-like links, $s$, $s$, which, at their upper ends, are pivotally connected by a pin $t$ to the casting F, said pin $t$ passing also through the standard A, all as clearly shown.

G is the blade stock, to which is securely fastened, in the usual manner, one of the blades, or shovels, of the cultivator, and which is pivoted to the lower portion of the hollow casting F, by means of the pin, or stud, $w$, which also passes through the lower end of standard A. This blade stock G is formed, or provided, at its upper end, with rearwardly projecting lugs, or ear-pieces H, which are coupled by a pin, or stud, $g^2$ to the lower ends of a pair of link-bars, I, I, that, in turn, are pivoted (at their upper ends) to the lower ends of the plate-like links, $s$, $s$, and that are united by, or formed integral with, a cross-bar, or connecting plate, $i^2$. The said cross-plate $i^2$, is formed with a perforated, central, hub-like portion, that is screw-threaded and fitted with a set-screw K, the end of which bears against the rear edge of the standard A, and which is provided with a jam-nut L all in the manner shown, and for a purpose to be presently explained.

M is a shovel, or cultivator blade of one of the forms which may be attached to the blade, or shovel, stock, G, to which various forms of cultivator devices *per se* are bolted, according to the kind of work to be done by the machine.

In the use of a cultivator provided with my improvements, the operations of the devices herein shown, and, so far, described, mainly as to their constructions, are as follows:—Supposing the two standards A and B of one gang of shovels (designed to operate at one side of a row of plants) to be in the positions seen at Fig. 1, and that it be desired to lower the outer shovel, in order to have it work farther down into the "water furrow" of a row of plants, all that the operator, or attendant, of the machine has to do, is to loosen the set-screw, or binder-bolt $j$; lower the standard A (as indicated by the dotted lines at Fig. 2); and after having set the shovel on said standard to work at the desired depth, retighten said binder-bolt $j$. If it be desired to vary the angle, or "set," of the shovel, to make it throw the soil differently (according to the condition of the crop and the nature of the soil), all the attendant has to do is to unscrew the nuts $m^2$ of the bolts 1 and 2, thus releasing the parts C and E from each other; then shift the position of E, relatively to C (as indicated, for instance, by the dotted lines at Fig. 4); and then reunite, or again bolt together the parts alluded to. These adjustments, or variations, in the relationships of the parts, in order to change both the depth of cultivation, and the angle, or set, of the cultivator device *per se*, can be made, it will be observed, by any one of ordinary intelligence, without difficulty, and very quickly; while, at the same time, as will be seen, the construction is exceedingly simple, strong, and durable.

In running the machine, it often happens, as is well known, that the device attached to the shovel stock G comes into sudden contact with some immovable obstruction, and to prevent any injurious effect therefrom on the shovel, or other devices of the cultivator, it has been customary to have the stock G adapted to yield, or break-back, under any such undue and unusual strain and shock. Several means, or mechanisms, have been heretofore devised, to lend to the shovel stock this capacity to yield under undue strain, and, at the same time, automatically resume its proper working position, and maintain the same under the ordinary strains to which it must be subjected, during the usual operations of the cultivator. The means I have shown for this purpose comprises the socketed device F on the lower end of the standard, with its spring push-bar; the stock G pivotally connected to the lower end of casting F; and the pivoted links $s$, and I, coupled together, and, respectively, to the parts F and G; all in such manner, as herein shown, that the said two link-couplers form a sort of toggle-joint, that works against the actuating spring $q$, and is set, or adjusted, to act with a greater, or less, force, by means of the adjusting set-screw K. When set so that, as shown at Fig. 2, (in full lines,) the three pivotal points at which these link couplers are connected to each other and to the parts F and G, are nearly in a right line, the greatest force will be required to force back the lower end of the stock G in its working position; but when, by further screwing in the set-screw K, these three pivotal points are thrown more out of line, than will a less power, or strain, on the lower end of G, operate to force it back, and cause all the movable parts to assume the positions indicated at Fig. 3. Of course, the parts resume their normal positions as soon as the cultivator device, or shovel, shall have been relieved of the strain, or shock, which enforced their movement into the positions indicated in Fig. 3.

In practical operation, when the shovel suddenly comes into contact with some obstruction to the passage of the machine, the jar acts to flip the toggle joint-like coupler links, or start back, or break, the toggle-joint, so to speak, and then the continued strain on the shovel easily effects the further and complete rearward vibration of the lower end of stock G; and the spiral spring $q$ subsequently acts to return all the working parts to their original conditions. This mechanism while simple and exceedingly strong and durable, I have found to act perfectly in the field.

While with all the parts properly arranged and adjusted at the outset, the means for varying the adjustment of the toggle-joint (which, in the case shown, is the set-screw K) might be dispensed with, I prefer to have the mechanism thus capable of adjustment; since I am thereby enabled to regulate the action of the mechanism, in accordance with any variations there may be in the actions of different springs on different machines, and the farmer can vary the action of the break-back shovel stock, as circumstances may seem to render advisable.

As the separable parts of my invention may be used singly, with more, or less, advantage, I wish it to be understood that I do not confine myself to the use of all the features herein shown and described in a single machine, though I have, so far, embodied them in one cultivator, and thereby all the fruits of my invention are reaped. I also wish it to be understood that in carrying out either, or all, of the novel structural features peculiar to my improved cultivator, many variations in the details may be made, without departing from the spirit of my invention, so long as such changes do not materially affect the principle of construction and mode of operation of the shown and described machine.

Having now so fully described my improvements, that those skilled in the art can make and use cultivators embodying the same, what I claim as new, and desire to secure by Letters Patent, is—

1. In a cultivator, the combination with the beam D; and the standard A, of the shoe-piece C, formed with the notched end flanges $c$; the shoe-piece E, provided with serrations $e$, at each end, and formed with an integral loop, or yoke, for the reception of said standard A; the bolt $j$ for adjustably fastening said standard in said loop; and securing bolts 1 and 2 for adjustably fastening the two shoe-pieces to each other and to the beam D; all substantially as and for the purposes set forth.

2. In a cultivator, the combination, with the standard, of a socket-like device F; A shovel-stock pivotally connected to said device and having rearwardly projecting portions; a set of toggle-joint coupler devices pivoted together, and respectively coupled to the device F, and the shovel stock; and a spring-actuated push-bar; the whole arranged to operate in substantially the manner and for the purpose set forth.

3. In combination with the devices F and G, pivotally connected; the toggle-joint connections, as specified; and the spring actuated push-bar, means for setting the said toggle-joint connections more, or less, out of line; all substantially as and for the purpose described.

In witness whereof I have hereunto set my hand this 12th day of December, 1893.

WILFORD H. HOLSCLAW.

In presence of—
  Ed. P. Piatt,
  Leonard M. Dow.